G. W. NISTLE.
APPARATUS FOR HEATING OR COOLING LIQUIDS.
APPLICATION FILED JUNE 13, 1910.
991,636.
Patented May 9, 1911.
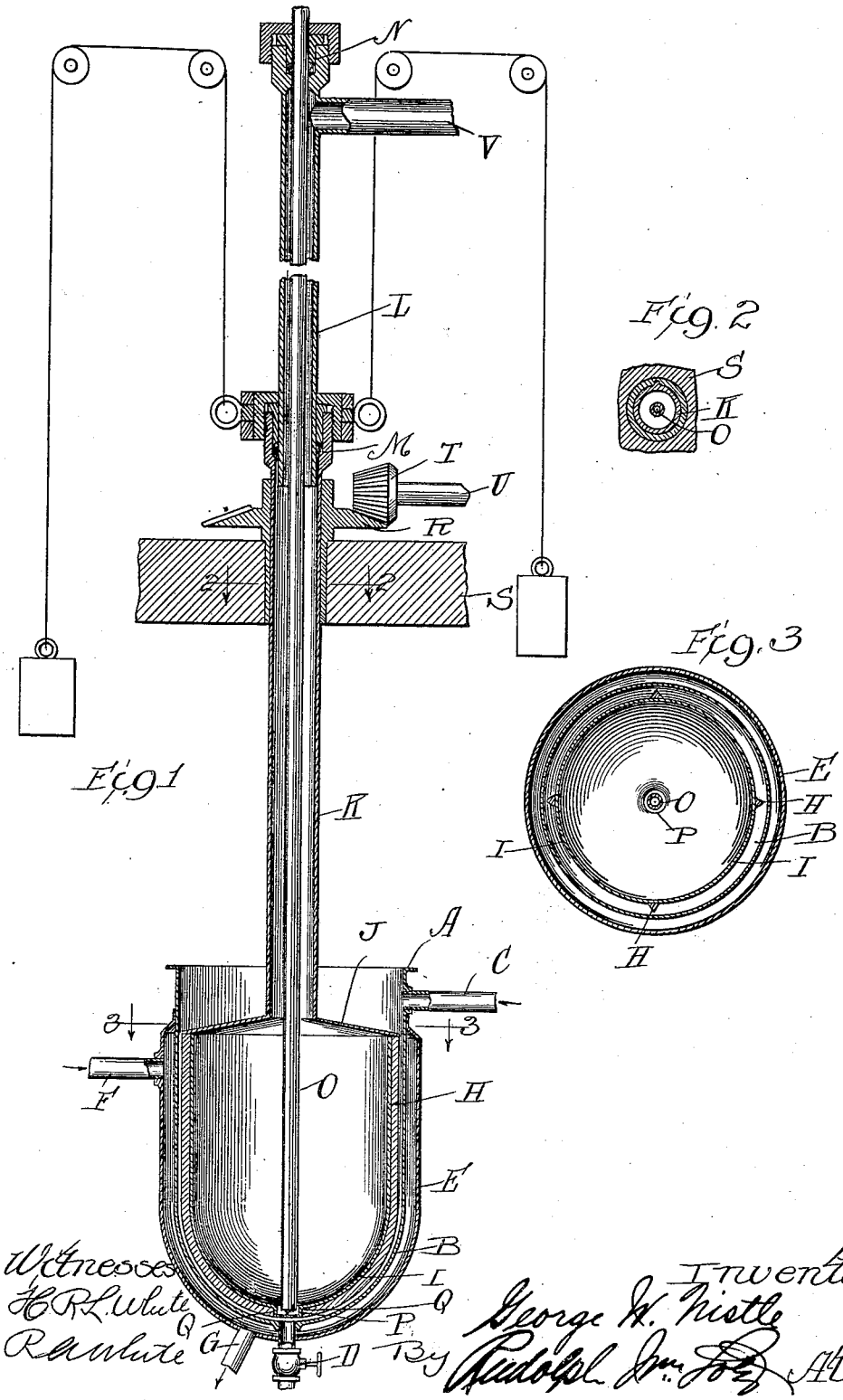

UNITED STATES PATENT OFFICE.

GEORGE W. NISTLE, OF NORTH MUSKEGON, MICHIGAN.

APPARATUS FOR HEATING OR COOLING LIQUIDS.

991,636.  Specification of Letters Patent.  Patented May 9, 1911.

Application filed June 13, 1910. Serial No. 566,692.

*To all whom it may concern:*

Be it known that I, GEORGE W. NISTLE, citizen of the United States, residing at North Muskegon, in the county of Muskegon and State of Michigan, have invented certain new and useful Improvements in Apparatus for Heating or Cooling Liquids; and I do hereby declare the following to be a full, clear, and exact description of the invention, such as will enable others skilled in the art to which it appertains to make and use the same.

This invention relates to a novel construction in an apparatus for heating or cooling liquids and at the same time agitating the same, the object being to provide a simple and efficient apparatus for this purpose, and consists in the features of construction and combinations of parts hereinafter fully described and claimed.

In the accompanying drawings illustrating this invention: Figure —1— is a central vertical longitudinal section of an apparatus constructed in accordance with my invention. Figs. —2— and —3— are plan sections of the same on the lines 2—2 and 3—3 respectively, of Fig. —1—.

My invention has for its particular object to provide means whereby liquids may be heated or cooled with great rapidity by means of a fluid attemperating agent and at the same time agitated during the heating or cooling process in order to prevent coagulation, crystallization, scorching, or other undesirable results, and further to throw all parts of the liquid repeatedly in contact with the heating or cooling surfaces whereby the desired change of temperature is effected with great rapidity.

A further object of my invention is to provide an apparatus for the purpose specified all parts of which are easily accessible for purposes of cleansing and repair.

My invention is particularly adapted for heating milk preparatory to its passage into vacuum pans or the like wherein surplus water is extracted therefrom by evaporation for the production of the product known as condensed milk, and is particularly intended for this class of work although obviously it may be applied for heating or cooling liquids other than milk.

The invention consists of a vessel A which is preferably cylindrical and is equipped with a concave bottom B, the latter being preferably semi-spherical in form. Said vessel is provided at any suitable point with an inlet C for the liquid to be heated or cooled and in its bottom is provided with an outlet D for the same, the latter being necessarily valve-controlled in order to retain the liquid in the vessel a sufficient length of time to effect change of temperature thereof. Disposed around said vessel from a point adjacent the upper end portion of the same and extending entirely around the bottom thereof is a jacket E adapted to receive heating or cooling fluid from a pipe F, said jacket being equipped with a drain or return pipe G through which the heating agent (such as water of condensation from steam) or cooling agent escapes. The said vessel A is adapted to receive what I term a displacing device H consisting of a main cylindrical portion having a dished bottom I preferably concentric with the bottom B of the receptacle A, and which is equipped with a conical head J. The said cylinder H is of less diameter than the cylinder A so as to leave a free annular space between the same when said cylinder H is inserted into said cylinder A. The former is adapted to act to displace liquid contained in said cylinder A so as to cause the same to rise to a higher level therein thereby causing the same to be divided into a mass of less depth and spreading the same more completely over a large attemperating area. The said head J of said cylinder H is connected with a source of supply of a heating or cooling agent as for example a steam supply pipe K of relatively large diameter which communicates through a central opening in said cover with the interior of said cylinder H. The said pipe K at its upper end receives a telescopically interfitting smaller steam supply pipe L, a fluid tight joint between said pipes K and L being effected by means of the stuffing box M in the usual manner. Passing through said pipes K and L and through a stuffing box N in the upper portion of the latter is a return or discharge pipe O of smaller diameter which projects at its lower end into a trap P formed in the lowermost portion of the bottom I of said cylinder H, the circumferential wall of said trap constituting a small hub to the external face of which the lower ends of ribs Q are secured, the latter following the contour of the bottom I and extending longitudinally of the cylinder H and being secured in any desired manner to the outer faces of said respective parts, the depth of said ribs Q being less than the width of the annular space between said cylinders A and H and the bottoms B and I thereof respectively. The said pipe K passes through the hub of a bevel gear R suitably supported on a beam S or the like and which meshes with a bevel pinion T on a suitable power actuated shaft U. The said hub of said bevel gear R is splined upon said pipe K as shown in detail in Fig. —2— whereby said pipe K is rotatably rigid with said bevel gear but is longitudinally movable relatively to the latter. The said pipe L is connected between its ends with a steam supply pipe V.

My said apparatus is intended to be employed particularly in condensed milk plants and is adapted for heating given quantities of milk to a given temperature within a very short time preparatory to passing the heated milk into the vacuum pans. This work must be done with great rapidity and furthermore the milk must be maintained constantly in motion during the heating thereof so as to prevent coagulation of the same or scorching thereof by contact of thin films with the hot surfaces. The heating agent employed is preferably steam.

In operation the pipe K carrying the cylinder H or displacing device, as I prefer to term it, is normally raised so as not to extend into said cylinder A but after the requisite volume of the milk has been introduced into said cylinder A the said pipe K and displacing device are lowered into said cylinder thereby causing the milk to rise to a level substantially equal to the height of the steam jacket E whereby said milk becomes distributed over the entire heating area of the cylinder A and over almost the entire heating surface of said displacer H—I. The steam admitted to the jacket E and to said displacer H—I will, of course, act to rapidly raise the temperature of the milk but during the time that the latter is absorbing heat from the respective surfaces with which it is in contact said displacing device and pipe K are maintained in rotation thus maintaining the milk constantly in motion and preventing scorching, coagulation or separation thereof as would otherwise occur. After each batch of milk has been heated to the required degree it is drained off through said pipe D and at the same time said displacing device is raised, in any suitable manner, the means for raising the same consisting for example of cables W secured at one end to the rotatable collar X on the cap of the stuffing box M and between their ends trained over pulleys Y, the other ends thereof carrying counterweights Z adapted to substantially counterbalance or partially counter-balance the weight of said displacing device and pipe K and which said cable may be manually or in any other suitable manner pulled down or the counterweights Z similarly raised to effect raising and lowering respectively, of said displacer.

The depth of the displacer H—I is less than that of the receptacle A so that a relatively large free space is provided in the upper portion of the latter into which the liquid will overflow in the event of violent boiling and consequent foaming thereof, the over-flowing liquid draining back into the annular heating space from the conical head J. The continuous stirring of the liquid during heating will serve to prevent the so-called boiling over of the same unless heated to an extraordinary degree.

The apparatus being mainly intended for heating liquids I have employed the term "heating fluid" in the appended claims, it being understood that a cooling fluid may be substituted when it is desired to reduce the temperature of the liquid.

I claim as my invention:

1. An apparatus for heating liquids comprising a receptacle for liquids, a jacket thereon, connection between said jacket and a source of supply of heating fluid, a hollow displacing member corresponding in shape substantially with the said receptacle and adapted to be inserted into the latter to raise the level of liquid therein and distribute the same in a relatively thin layer between the opposing inner and outer walls of said receptacle and displacing member respectively, projections on the outer face of said displacing member, connection between the latter and a source of supply of heating fluid, and means for relatively rotating said receptacle and said displacing member on a common axis.

2. An apparatus for heating liquids comprising a receptacle for liquids, a jacket thereon, connection between said jacket and a source of supply of heating fluid, a hollow displacing member corresponding in shape substantially with the said receptacle and adapted to be inserted into the latter to raise the level of liquid therein and distribute the same in a relatively thin layer between the opposing inner and outer walls of said receptacle and displacing member respectively, projections on the outer face of said displacing member, a hollow stem on said displacing member, a pipe connected with a source of supply of heating fluid having telescopic connection with said hollow stem, and power actuated means engaging said hollow stem for rotating said displacing member.

3. An apparatus for heating liquids comprising a receptacle for liquids, a hollow displacing member of less length and diameter than said receptacle adapted to be inserted in the latter to raise the level of liquid therein and distribute the same in a relatively thin layer between the opposing walls of said receptacle and said displacing member respectively, projections on the outer face of said displacing member, a jacket on said receptacle extending to a height substantially equal to the length of said displacing member, connection between said jacket and a source of supply of heating fluid, a hollow stem on said displacing member, gearing between the latter and a source of power for rotating said displacing member relatively to said receptacle, a pipe connected with a source of supply of heating fluid telescopically connected with said hollow stem and communicating with the latter, said displacing member being vertically movable relatively to said receptacle and said pipe for inserting and removing the same.

In testimony whereof I have signed my name in presence of two subscribing witnesses.

GEORGE W. NISTLE.

Witnesses:
 RUDOLPH WM. LOTZ,
 M. M. BOYLE.

Copies of this patent may be obtained for five cents each, by addressing the "Commissioner of Patents, Washington, D. C."